J. R. BYLER.
Harvester Rake.
No. 30,852.
Patented Dec. 4, 1860.
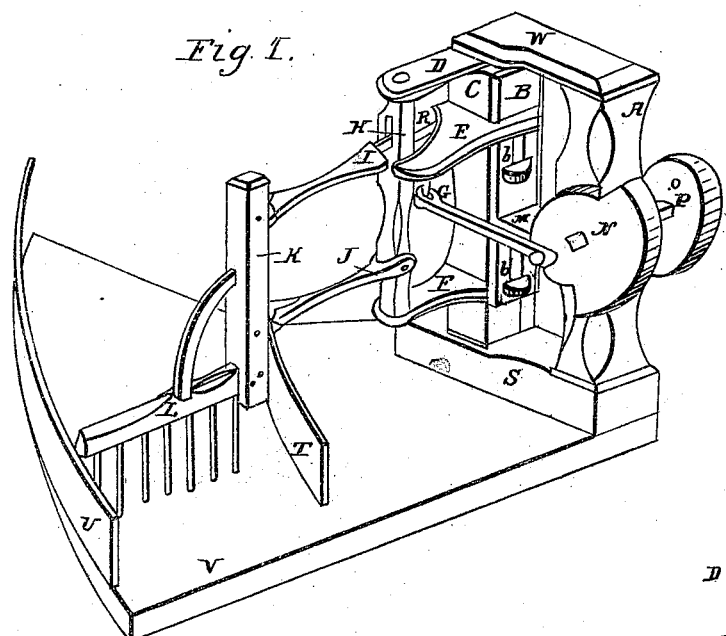
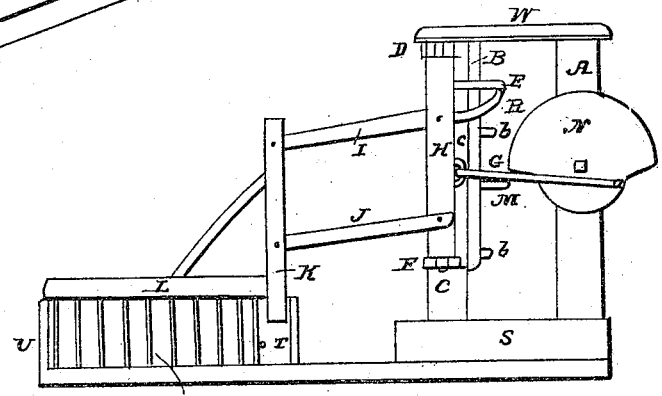
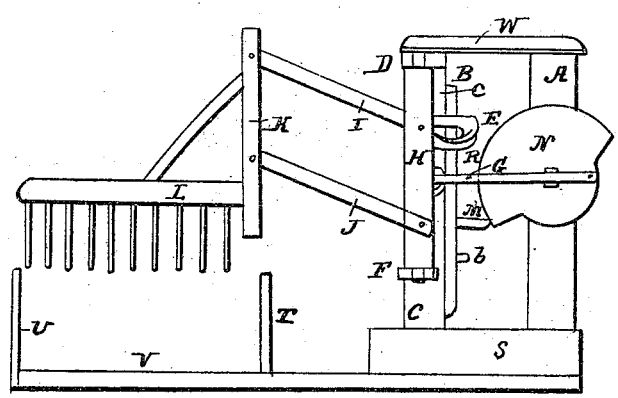
Witnesses:
L. L. Musser
Jacob Stauffer
Inventor:
Jacob R. Byler

UNITED STATES PATENT OFFICE.

JACOB R. BYLER, OF SALISBURY, LANCASTER COUNTY, ASSIGNOR TO HIMSELF, AND HUGH W. BLACK, OF LANCASTER COUNTY, PENNSYLVANIA.

IMPROVEMENT IN RAKES FOR REAPING-MACHINES.

Specification forming part of Letters Patent No. 30,852, dated December 4, 1860.

*To all whom it may concern:*

Be it known that I, JACOB R. BYLER, of Salisbury township, in the county of Lancaster and State of Pennsylvania, have invented a new and Improved Device for Operating Rakes to be Attached to Reaping-Machines; and I do hereby declare that the following is a full, clear, and exact description of the construction and operation of the same, reference being had to the accompanying drawings, making a part of this specification, in which—

Figure 1 is a perspective view of the combination and arrangement of the parts employed; Fig. 2, a side elevation with the rake up; Fig. 3, the same with the rake down, illustrating the position of the several pieces, more fully described thus:

On a base, S, are two uprights, A C, joined at top by the cross-piece W. The upright A supports the shaft, with its pulley O and cam N. The upright C supports the rock or rake shaft H by arms D and F, in which the shaft has its bearings. There is also on the inside of C a vertical sliding board, H, having a lever-arm, E, near its upper end, and centrally a projecting peg or cog, M, confined in its up and down motions by the headed pins $b$ in the vertical slots of B. The rake or rocker shaft H is connected with the upright rake-head K (to which the rake L is braced) by two vibrating braces or levers, I J. The upper lever, I, passes through a slot (in which is the fulcrum-pin) in H, its curved projecting end R resting against the under side of the arm E, so made that the end (with or without a friction-roller) traverses upon said arm E in the turning motions of the shaft H, which motion is imparted by means of its connection G with the cam N, as shown.

The operation is as follows: The wheel N has an enlarged circumference on one-half of its outer face, constituting the cam N, which in its revolutions comes in contact with the peg M, pressing down the slide-board B, with its lever E, thereby depressing the inner arm, R, of the vibrating lever I, which necessarily raises the other end, and with it the combined rake-head K L and lever J, and retains the rake in this elevated position, Fig. 2, while the rake is being carried forward, by the turning of the shaft H through the connection G with the cam, for a semi-revolution, so arranged that when the rake is brought to its proper position behind the sickles the peg M becomes released by the terminus of the cam N, and by the force of gravitation the rake drops onto the platform and is carried in its backward sweep over it, effectually cleaning it of its contents, when the enlarged circumference again comes in contact with the peg M, to raise and repeat the motion of the rake. This is calculated for the ordinary short or quadrant form of the circular platform, and is simple and effectual in its operations.

I am aware that the cam and connecting-rod are not new, nor the parallel vibrating arms; nor do I claim such, separately considered.

What I claim as my invention, and desire to secure by Letters Patent, is—

The arrangement of the upright slide B, with its lever-arm E, peg M, and headed pins $b$, in connection with the lever-arm R I and turning shaft H, and operated by the rod G and cam N in the manner described, for the purpose specified.

JACOB R. BYLER.

Witnesses:
S. G. MUSSER,
JACOB STAUFFER.